US011434610B2

(12) United States Patent
Tyaglin

(10) Patent No.: US 11,434,610 B2
(45) Date of Patent: Sep. 6, 2022

(54) URBAN TRANSPORTATION AND LOGISTICS SYSTEM

(71) Applicant: Denis Valentinovich Tyaglin, Novosibirsk (RU)

(72) Inventor: Denis Valentinovich Tyaglin, Novosibirsk (RU)

( * ) Notice: Subject to any disclaimer, the term of this patent is extended or adjusted under 35 U.S.C. 154(b) by 0 days.

(21) Appl. No.: 16/310,672

(22) PCT Filed: Jun. 1, 2017

(86) PCT No.: PCT/RU2017/000383
§ 371 (c)(1),
(2) Date: Dec. 17, 2018

(87) PCT Pub. No.: WO2018/030915
PCT Pub. Date: Feb. 15, 2018

(65) Prior Publication Data
US 2019/0249374 A1    Aug. 15, 2019

(30) Foreign Application Priority Data

Aug. 11, 2016    (RU) ................................ 2016133160

(51) Int. Cl.
*E01C 1/04*    (2006.01)
*E01C 1/00*    (2006.01)
(Continued)

(52) U.S. Cl.
CPC .............. *E01C 1/002* (2013.01); *A01G 31/00* (2013.01); *E01B 2/00* (2013.01); *E01B 29/00* (2013.01);
(Continued)

(58) Field of Classification Search
CPC ....................................................... E01C 1/04
(Continued)

(56) References Cited

U.S. PATENT DOCUMENTS

| 427,836 | A | * | 5/1890 | Clarke | .................. | E01B 25/305 |
| | | | | | | 104/124 |
| 671,686 | A | * | 4/1901 | Bergeron | .............. | E21F 17/103 |
| | | | | | | 404/1 |

(Continued)

FOREIGN PATENT DOCUMENTS

| RU | 36018 U1 | 2/2004 | | |
| RU | 2314947 C2 | 1/2008 | | |
| WO | WO-2005063544 A1 * | 7/2005 | ............. | B61B 15/00 |

OTHER PUBLICATIONS https://www.rchstudios.com/projects/tysons-corner/ (Year: 2014).*
(Continued)

*Primary Examiner* — Thomas B Will
*Assistant Examiner* — Katherine J Chu
(74) *Attorney, Agent, or Firm* — Muncy, Geissler, Olds & Lowe, P.C.

(57) ABSTRACT

Disclosed are transport and logistics systems of large cities that may be used in construction of cities with population of over five hundred thousand people. The technical result of the proposed solution is to optimize the urban transport and logistics system, eliminate traffic congestions and ensure rapid movement to any point in the city. The urban transport and logistics system includes the first ground level for road and rail freight transport, the second level of pipeline and technical communications, the third level of passenger transport, the fourth pedestrian level, each level being located one above the other, and they are connected with each other and with residential and non-residential buildings by vertical staircase-elevator modules.

16 Claims, 1 Drawing Sheet

(51) Int. Cl.
*E04B 1/00* (2006.01)
*A01G 31/00* (2018.01)
*E01B 2/00* (2006.01)
*E01B 29/00* (2006.01)
*E04H 14/00* (2006.01)
*F16L 3/00* (2006.01)

(52) U.S. Cl.
CPC .............. *E01C 1/04* (2013.01); *E04B 1/00* (2013.01); *E04H 14/00* (2013.01); *F16L 3/00* (2013.01)

(58) Field of Classification Search
USPC ........................................................... 404/1
See application file for complete search history.

(56) References Cited

U.S. PATENT DOCUMENTS

| | | | | |
|---|---|---|---|---|
| 1,784,728 A | * | 4/1927 | Harriss | |
| 1,628,934 A | * | 5/1927 | Turner | E01C 1/04 104/124 |
| 1,629,787 A | * | 5/1927 | Hackett | E01D 1/00 52/175 |
| 1,830,518 A | * | 11/1931 | Mason | E04H 6/10 404/1 |
| 3,405,612 A | * | 10/1968 | Pearson | E01C 1/002 404/1 |
| 5,655,244 A | * | 8/1997 | Minakami | B61B 15/00 104/18 |
| 6,561,727 B1 | * | 5/2003 | Gustafson, Jr. | E01C 1/002 404/1 |
| 7,857,543 B2 | * | 12/2010 | Troster | E01D 1/00 14/2 |
| 7,866,910 B2 | * | 1/2011 | Gustafson | E01C 1/002 404/1 |
| 8,172,478 B2 | * | 5/2012 | Sing | E01C 1/002 404/1 |
| 2009/0035058 A1 | * | 2/2009 | Berman | E01C 1/002 404/1 |
| 2014/0205376 A1 | * | 7/2014 | Derenoncourt | E01C 1/04 404/1 |
| 2015/0299965 A1 | * | 10/2015 | Collie | E01F 7/02 404/1 |

OTHER PUBLICATIONS

"New Plaza at Tysons Corner Center is Fun and Fab" https://www.funinfairfaxva.com/new-plaza-tysons-corner/ (Year: 2014).*

Northeast Ohio Regional Sewer District; "The Onion jokes about elevated sewers in Cleveland, learns there actually are elevated sewers in Cleveland"; Feb. 27, 2018; Medium.com https://medium.com/@neorsd/lol-um-onion-clevelands-elevated-sewers-are-actually-a-thing-2f8dff5c6423 (Year: 2018).*

Virginia Plumbing Code, Chapter 7—Sanitary Drainage http://ecodes.biz/ecodes_support/free_resources/Virginia2009/09Plumbing/PDFs/Chapter%207_Sanitary%20Drainage.pdf (Year: 2009).*

* cited by examiner

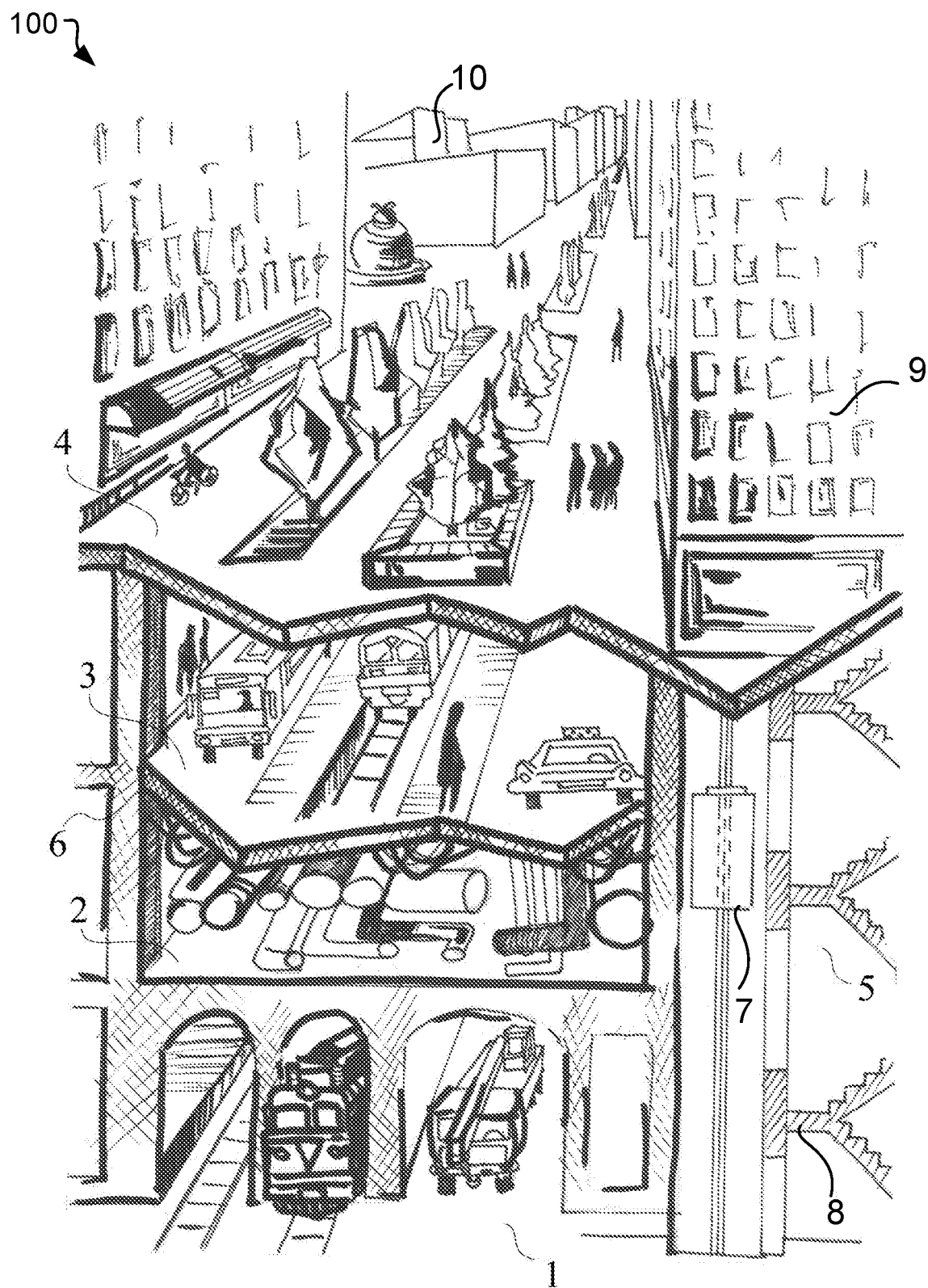

URBAN TRANSPORTATION AND LOGISTICS SYSTEM

FIELD OF INVENTION

The invention relates to transportation and logistics systems of large cities, and may be used in construction of cities with population of over five hundred thousand people.

BACKGROUND OF THE INVENTION

Modern urban development is characterized by emergence of urban transport crises associated with congestion, accidents, the average transport speed droop, environmental degradation, psychological stress, and decrease in the energy efficiency of transport.

A lot of inventors are working on solving these problems, for example, "URBAN TRANSPORT COMPLEX WITH A MULTIFUNCTIONAL ELEVATED STRUCTURE" is known from patent RU No. 73372 (priority of 20 May 2008). A city transportation complex is disclosed, which includes objects integrated into existing urban space with fully developed infrastructure that is not subject to demolition: buildings (for example, railway station buildings with arrival and departure halls, hotels, business and shopping centers), a railway station forecourt with underground access highways, parking, expressway line or car overpass, pedestrian zones made in the form of covered footbridges and connected to the station platform for passengers, who are getting on/off, the pedestrian zones of covered footbridges are made in the form of at least one multi-purpose overpass located between buildings above access roads and the railway station forecourt, above the expressway and parking, while the multi-purpose overpass is mounted on supports from separate bulk modules connected by fasteners, providing the option of modular addition both in the longitudinal and transverse directions, and equipped with staircase-elevator modules and escalators for connection with the station platform for passenger getting on/off, wherein the individual bulk modules do not exceed 40 tons.

"TURNKEY CITY CONSTRUCTION METHOD AND MULTIFUNCTIONAL URBAN COMPLEX" is the closest solution know from application for the invention of the Russian Federation No. 2014110646 (priority of 20 Mar. 2014). A turnkey city construction method includes the construction of multistory residential and non-residential buildings, supplying them with above-ground and underground utilities, the formation of roads and sidewalks and multi-level inner-yard territories with parking. During the construction of multistory residential buildings, large courtyard car-free territories are formed, designed to accommodate the infrastructure within children's walking distance, including kindergartens, schools, leisure and cultural institutions, and non-residential buildings are located centrally to form the rest of the urban infrastructure, including administrative and commercial buildings. At that, the buildings are built using fast frame-monolithic technology, from prefabricated multi-layer large-format wall panels with external and internal finishing. Before developing the building area, the ground is cleaned and leveled, and then laser planning of the terrain is performed using laser illumination of the lines of location of structures and further marking of the soil for the structures; then the soil is removed along the marked lines and the foundation works are being carried out simultaneously with the formation of parking lots in the lower building levels, as well as with the construction of engineering communications, while transporting urban highways are connected with the parking lots located in the lower building levels. At the same time, the urban complex is supplied with interchange modules of intercity high-speed transport lines connected with roads using devices for automated passenger delivery.

The known solution contains a division into levels (underground and surface parking, car-free areas), which is in common with the proposed solution, and sectors (children's and administrative-and-household infrastructure), but the multi-level system is not sufficiently developed and structured in the known solution; among other things, different types of transport are not separated by different levels, which does not rule out the appearance of traffic congestion caused by the accumulation of transport in the junctions of transport routes, and makes the horizontal zoning of the territory necessary.

DISCLOSURE OF INVENTION

The present invention allows to build a city with million people population, having an optimal transportation and logistics structure, in which there are no traffic congestions and accidents involving pedestrians, since the transportation and logistics system is multilevel and its transport levels do not intersect with each other, eliminating the emergence of hubs, in which traffic congestions are formed, and are interconnected by vertical ties, for example, elevators, staircases, escalators, etc., which interconnect not only transport levels, but also floors of residential and non-residential premises.

The technical result of the proposed solution is to optimize the transportation and logistics system of the city, eliminate traffic congestions and ensure rapid movement to any point in the city.

The technical result is achieved by the urban transportation and logistics system that includes the first ground level for freight road and rail transport, the second level of pipeline and technical communications, the third level of passenger transport, the fourth pedestrian level, each level being located one above the other by means of reinforced concrete structures, and they are connected with each other and with residential and non-residential buildings by vertical staircase-elevator modules.

BRIEF DESCRIPTION OF DRAWINGS

FIG. 1 shows an urban transportation and logistics system, according to an example embodiment.

BEST MODE FOR CARRYING OUT THE INVENTION

The urban transportation and logistics system is implemented as follows.

A ground-level multistory frame is constructed by known methods, for example, of reinforced concrete using removable formwork, the height of each level is from 7 to 10 meters. At the first ground level, railway tracks for freight railway transport and motor roads for freight road transport are built, then, on reinforced concrete racks above the first level, a second engineering and technical level is located, at which pipelines are installed, such as water mains, heat and sewer pipes, garbage chute constructions, gas, electric networks, etc. The third level is equipped for passenger transport, namely, metro trains, travelators, electric buses, etc. The fourth level is designed and built for pedestrians (no means of transport other than man-powered one is permitted). It is the last one, and there are no other levels above it, so it is located under the open sky, and in some areas it can be equipped with a roof that protects against environmental influences, such as rainfall. The fourth level is a natural landscape and contains soil on its base, equipped with a hydroponics system (parts of which may be located on the second engineering and technical level) to maintain the life of plants and trees that form parks. Besides the natural park landscape, the level contains the necessary infrastructure: walking and cycling paths, children's and sports grounds, as well as other recreation areas for city residents. Also, on the fourth level, residential and non-residential high-rise buildings are located, elevator and staircase systems of which connect the floors of buildings with all levels of the transport system, and thus moving a person from building to building is ensured without having to go out through the third transport level.

FIG. 1 shows an urban transportation and logistics system 100, according to an example embodiment. The system 100 may include a ground-level multistory frame 6, a first level 1 for road freight transport and rail freight transport, a second level 2 for pipelines and technical communications, a third level 3 for passenger transport, a fourth level 4 for pedestrians, and a vertical staircase-elevator module 5. The vertical staircase-elevator module may include an elevator 7 and a staircase 8. The fourth level 4 may include at least one multistory residential building 9 and at least one multistory non-residential building 10. Both the elevator 7 and the staircase 8 are configured to interconnect the first level 1 for road freight transport and rail freight transport, the second level 2 for pipelines and technical communications, the third level 3 for passenger transport, the fourth level 4 for pedestrians, and floors of multistory residential building 9 or floors of non-residential buildings.

The urban transportation and logistics system operates as follows.

A person lives, for example, in a hundred-story apartment building (an apartment building with a large number of floors is cost-effective for this system) in a city with a fully developed transport and logistics system. The garbage thrown out by a garbage chute immediately goes to the second engineering and technical floor, and then lower on the first floor to wagons of a freight train that takes the garbage to a recycling site, thus, there are no garbage cans in the same plane (same level) with human life (a person does not see garbage cans near the house and children's playgrounds, etc.), there are no garbage collection issues or traffic congestions caused by operation of garbage trucks. Water supply systems, electricity, heat flow to the apartment of a person from the second technical floor, during the breakthrough/repair of which the living space (fourth and third levels) of the person will not be affected in any way. The person can also walk in the park located on the fourth level, and go to work, even if the breakthrough of the sewage system or water line occurred at the same latitude and longitude with him/her, since these levels do not overlap and are above each other, and the repair and maintenance services of all systems of the second technical floor will not block or interfere with the operation of transport systems of other levels. The person goes down to the third level of passenger transport on a vertically moving elevator straight from his/her apartment building, without going outside, and quickly, without traffic congestions, moves to the desired point of the city. As transport systems are separated, there are no congestions, there are no pedestrian crossings at this level or freight traffic flow sections, pipeline transportation system. Upon arriving at the desired point in the city, the person takes the elevator to the fourth ground level, for example, to the park, where he/she works as a fitness instructor. Thus, being in the city with the proposed transport and logistics system, the person will quickly move to the point he/she needs, with no traffic congestions, garbage cans, the atmosphere polluted with exhaust gases, with no possibility to be hit by any vehicle, because each of the systems is optimally located at its level, without blocking or interfering with the operation of another system located at a parallel non-intersecting level. This will be a solution to the transport problem, a catalyst for internal development aimed at the rational use of the city's areas.

The present invention with the whole set of essential features greatly optimizes the transportation and logistics system of the city, eliminating traffic congestions and ensuring quick movement to any point therein.

INDUSTRIAL APPLICABILITY

The invention may be used in construction of million people population cities from scratch, meets the requirement of industrial applicability, since the technologies of its construction are known and are common today.

The invention with the whole set of the essential features for a specialist is not obvious from the prior art, therefore, it involves an inventive step.

This technical solution is not limited to the embodiments shown here and can be freely modified within the framework of the technical solution.

The invention claimed is:

1. An urban transportation and logistics system, the system comprising:
a first level roads for road freight transport and rail freight transport, the first level being located at a ground level;
a second level equipped with pipelines, the pipelines comprise water supply, electricity supply, heat supply, gas supply, waste transfer, and a sewer system, the second level is disposed above the first level and above the ground level;
a third level equipped for passenger transport, the third level being disposed above the second level, wherein the third level includes railway tracks and motor roads for the passenger transport; and
a fourth level designed for pedestrians, the fourth level being disposed above the third level and the second level and in the open sky, the fourth level including a base, a soil placed on the base, live plants and trees grown from the soil to form a natural park landscape, residential buildings, non-residential buildings, pedestrian walking paths, human-powered transport paths, children's grounds, and sport grounds, and wherein the third level and the fourth level are configured on separate planes;
wherein a traffic of the pedestrians, a traffic of the passenger transport, and a traffic of the road freight transport and rail freight transport are separated from each other; and
wherein the first level, the second level, the third level, and the fourth level are connected with each other by vertical staircase-elevator modules, wherein each of the vertical staircase-elevator modules includes at least one of an elevator and a staircase, the elevator being configured to connect at least two of the first level, the second level, the third level, and the fourth level and the staircase being configured to connect at least two of the first level, the second level, the third level, and the fourth level.

2. The system of claim 1, further comprising a multilevel frame accommodating each of the first level, the second level, the third level, and the fourth level one above the other.

3. The system of claim 1, wherein the first level includes railway tracks for the rail freight transport and motor roads for the road freight transport.

4. The system of claim 1, wherein the third level includes railway tracks and motor roads for the passenger transport.

5. The system of claim 1, wherein the fourth level further includes a garbage chute connected with a waste transfer pipeline of the plurality of pipelines of the second level.

6. The system of claim 1, wherein the fourth level includes a hydroponics system incorporated into the base and connected with the plurality of pipelines of the second level to form a natural park landscape.

7. The system of claim 6, wherein the residential buildings and the non-residential buildings are connected to each of the first level, the second level, the third level, and the fourth level by the vertical staircase-elevator modules.

8. A method for constructing an urban transportation and logistics system, the method comprising:
 building a first level equipped for road freight transport and rail freight transport, wherein the first level is located at a ground level;
 building a second level equipped with pipelines, the pipelines comprise water supply, electricity supply, heat supply, gas supply, waste transfer, and a sewer system, wherein the second level is built over the first level and above the ground level;
 building a third level equipped for passenger transport, wherein the third level is built over the second level, wherein the third level includes railway tracks and motor roads for the passenger transport; and
 building a fourth level designed for pedestrians, wherein the fourth level is built over the third level and the second level and in the open sky, the fourth level including a base, a soil placed on the base, live plants and trees grown from the soil to form a natural park landscape, residential buildings, non-residential buildings, pedestrian walking paths, human-powered transport paths, children's grounds, and sport grounds, and wherein the third level and the fourth level are configured on separate planes; and
 connecting the first level, the second level, the third level, and the fourth level with each other by vertical staircase-elevator modules, wherein each of the vertical staircase-elevator modules includes at least one of an elevator and a staircase, the elevator being configured to connect at least two of the first level, the second level, the third level, and the fourth level and the staircase being configured to connect at least two of the first level, the second level, the third level, and the fourth level,
 wherein a traffic of the pedestrians, a traffic of the passenger transport, and a traffic of the road freight transport and rail freight transport are separated from each other.

9. The method of claim 8, further comprising building a multilevel frame accommodating each of the first level, the second level, the third level, and the fourth level one above the other.

10. The method of claim 8, further comprising building, on the first level, railway tracks for the rail freight transport and motor roads for the road freight transport.

11. The method of claim 8, further comprising building, on the second level, a plurality of pipelines for one or more of the following: water supply, electricity supply, heat supply, gas supply, waste transfer, and a sewer system.

12. The method of claim 11, further comprising building, on the fourth level, a garbage chute connected with a waste transfer pipeline of the plurality of pipelines of the second level.

13. The method of claim 11, further comprising providing, on the fourth level, a hydroponics system incorporated into the base and connected with the plurality of pipelines of the second level to form a natural park landscape.

14. The method of claim 8, further comprising building a roof over the fourth level.

15. The method of claim 8, further comprising building, on the third level, railway tracks and motor roads for the passenger transport.

16. The method of claim 8, further comprising connecting each of the first level, the second level, the third level, and the fourth level to the residential buildings and the non-residential buildings located on the fourth level by the vertical staircase-elevator modules.

* * * * *